United States Patent [19]
Wilgus

[11] 3,830,123
[45] Aug. 20, 1974

[54] PLASTIC CUTTING ARRANGEMENT

[76] Inventor: James L. Wilgus, Reliable Plastics, Inc., 35 Middaugh St., Somerville, N.J. 08876

[22] Filed: July 3, 1973

[21] Appl. No.: 376,144

[52] U.S. Cl.............. 83/171, 83/356.1, 83/356.2, 83/404.3, 83/651.1
[51] Int. Cl............................................. B26d 7/10
[58] Field of Search ........ 83/16, 171, 212.1, 404.3, 83/356.1, 356.2, 356.3, 357, 425.2, 651.1

[56] References Cited
UNITED STATES PATENTS
| | | | |
|---|---|---|---|
| 798,291 | 8/1905 | Niebur, Jr. | 83/212.1 |
| 2,216,604 | 10/1940 | Schwimmer | 83/171 X |

*Primary Examiner*—J. M. Meister

[57] ABSTRACT

An arrangement comprising essentially two stationary hot wire grids and a third lower moveable hot wire grid is disclosed for noiselessly cutting randomly sized plastic block or scraps into relatively smaller uniform cubically-shaped pieces. Details are also disclosed for mounting the hot wires on the various grids to generate different shapes in three separate dimensions during a continuous operation.

9 Claims, 5 Drawing Figures

PLASTIC CUTTING ARRANGEMENT

BACKGROUND OF THE INVENTION

This invention relates to a plastic cutting arrangement for continuously cutting smaller plastic blocks or creating other shapes from randomly sized and shaped plastic material. More particularly this invention concerns a "recycling" process for forming useful plastic shapes from plastic waste and scrap.

Various cutting devices have been devised in the prior art to form regularly sized (uniform) pieces of plastic from relatively larger, but uniform, sections of raw material. These devices use "hot wire" cutters which are simply lengths of resistance wire stretched over a supporting framework and electrically heated. Depending upon the size of the plastic rectangular sections desired one or more of these wires are used and spaced a uniform distance apart. Then, the resistance wire is connected to a voltage source and heated to a sufficient temperature to slice the raw block as it comes into contact with it. A second set of wires oriented transversely to the aforementioned wires and situated below those cutters have also been used to recut the block thereby creating elongated rectangular blocks of plastic. Thus it may be appreciated that the majority of plastic cutters known in the prior art operate on the premise that the raw material to be cut is substantially uniform in shape.

It has been a problem in the plastic industry to find an economical way of disposing of scrap plastic, i.e., the discarded waste of a molding or fabricating processes. Although generally such scrap materials are relatively light it can assume enormous proportions of bulk. Attempts to reduce this bulk by chemical processes have proven to be either unsuccessful, expensive or cause objectionable odors. Also presently used grandulators are extremely noisy, or, often grind plastic sections excessively and create dust as well as useless powders.

In general, it is an object of the present invention to provide a single cutter apparatus for cutting scrap plastic of random sizes into useable packing material of substantially uniform dimensions.

Another object is to produce a plastic cutter arrangement which can be continuously fed to produce the useable packing material.

Another object is to produce a plastic cutter with the versatility for continuously forming compound or complex surfaces upon plastic stock.

SUMMARY OF THE INVENTION

These and other objects are achieved in accordance with an illustrative embodiment of my invention comprising a gravity-fed hot wire plastic cutter in which the cutting wires are installed on three separate frameworks. The frameworks are mounted one on top of the other, each in a substantially horizontal plane and such that the wire grid of the adjacent framework is transverse. The bottom framework is moveable and can, uniquely, be used in accordance with my invention to severe descending plastic sections after they have been shaped by the first two wire girds, or to introduce compound surfaces on the decending sections.

The resistance wire of the tow upper grids as well as the applied voltage thereto is choses on the basis of the speed of the continous operation desired. To operate my cutter, the raw/scrap plastic is laid on the uppermost grid, cut by heat and dropped on to the next grid. At the middle grid it is cut in the tranverse direction and dropped to the moveable bottom grid.

The resistivity of the wire, and the voltage applied, determine the temperature of the wires. The temperature of the first two sets of wire grids, the stationary units, will effect the rate of descent of the cut plastic sections. The temperature of the bottom grid wiring and the speed of the reciprocating motion of the bottom framework will determine the length/shape of the finished product. For packaging material I have found that a complete and quick separation of the decending rods occurrs with a wire temperature of 800° F.

In addition to the foregoing I have illustrated herein various ways in which the distance separating the wires of a particular grid can be quickly and efficiently adjusted to meet different cutting requirements. Also, I envision the possibility that such adjustments can be dynamically performed during the shaping and cutting process to introduces intricate shapes in the finished product as will be explained hereinafter.

The foregoing as well as other objects and features of my invention will be appreciated from a consideration of the attached drawing in which, FIG. 1 describes in a projected view my illustrative plastic cutter assembly;

DETAILED DESCRIPTION

Figure 1:
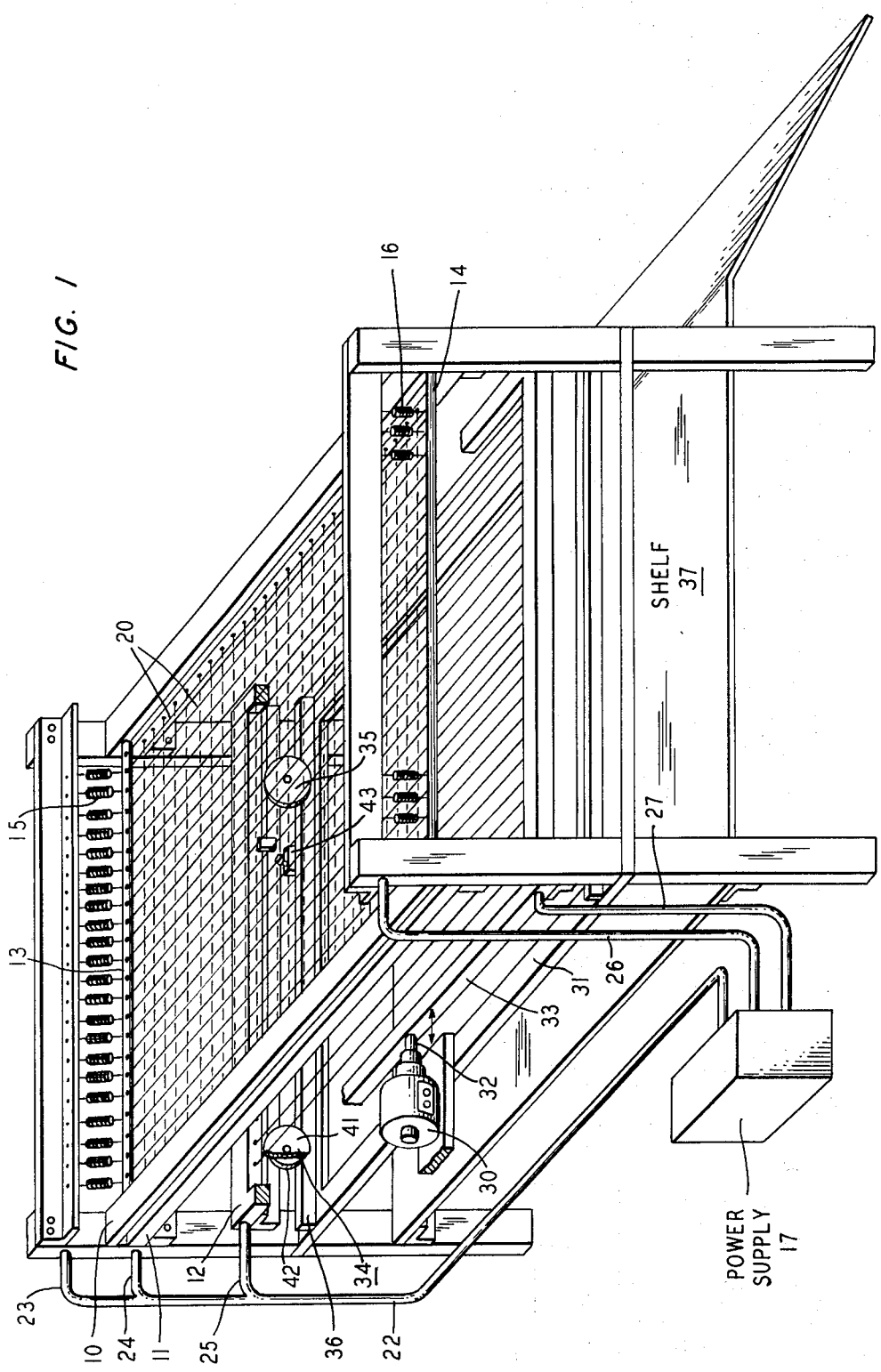

Considering my invention now in greater detail with reference to FIG. 1, my gravity fed plastic cutter has three wire grid frameworks 10, 11 and 12. For convenience in viewing the different frameworks I have shown framework 12 spaced far apart from framework 11 and a rather tight spacing between the two upper frameworks. It should be recognized that the vertical spacing between these frameworks is ordinarily uniform and that my invention in principle is not to be limited by the spacing arrangement of frameworks in FIG. 1.

Frameworks 10, 11 and 12 have uniformly spaced resistance wires strung in a substantially horizontal plane for their entire lengths. In the following discussion we will consider only the mechanical arrangement of framework 10 wiring but, as one can observe, much of this discussion also applies to frameworks 11 and 12. Framework 10 has illustratively 22 uniform spaced wires, e.g. wire 20, strung between members 13 and 14. The ends of each wire, e.g. wire 20, are connected to tensioning springs e.g. springs 15 and 16, to maintain proper alignment of each wire and to absorb elongations due to temperature increase.

Each of the wires of framework 10 are connected to power supply 17 via cable 22 which as shown in FIG. 1 has three branch feeding cable sections 23–25 connected to all three frameworks. The return potential of supply 17 is connected via cable 26 to the two upper frameowrks 10 and 11 (not shown). The importance of separate cable 27 which connects power supply 17 to framework 12 will be considered subsequently. Each of the wires of upper framework 10 are wired in parallel to cables 22 and 26 and therefore are uniformly the same temperature. This is also true of framework 11 because cables 22 and 26 feed the wires of that grid wiring in parallel with the wiring of framework 10.

Dependent upon the voltage potential difference and the resistivity factor of the grid wiring, each wire is heated to a precise temperature. It is necessary to achieve a temperature of 800° F for satisfactory operation in most instances To a degree, faster operation may be achieved by a "hotter" wire grid but the useful life of the wiring may also be lessened. The gauge of wire, the resistivity of each wire and the applied voltage are factors which must be determined for every installation and are deemed to be within the skill of the art.

It is possible to eliminate the need for a transformer by threading a continuous wire back and forth to form a grid of one physical and continuous wire. The current would remain the same for one wire whether it be 30 inches or 30 feet. This could be referred to as a series grid, as opposed to a parallel grid, electrically speaking.

An important aspect of my invention is the third grid on framework 12. This framework is continuously oscillating in the direction shown by the arrow heads of FIG. 1. Oscillator motor 30 is secured to member 31 and has a thrust rod 32 connected to side edge 33 of framework 12. Motor 30 is operated in conjunction with signals received from limit switches 40 and 43 (switch 40 best seen in FIG. 2) which periodically reverse the winding motor potentials to cause a thrust-withdrawal action of rod 32.

Framework 12 is wired similar to the upper frameworks but it connects via separate cable 24 to power supply 17. Thus the voltage potential of the moveable grid may be separately adjusted.

Framework 12 is equipped with the four flanged wheels, e.g. 34 and 35. The wheels in the foreground of FIG. 1 are blocked from view by the framework surfaces and member 33 has been broken away to permit wheel 34 to be viewed. Each wheel, e.g. wheel 34, is constructed of two contiguous concentric bodies- each of different diameters. The larger diameter body 41 contacts and bears at its perphifery upon a lower framework member, e.g. member 36. Thus, the sideway movement of moveable framework is constrained by the larger diameter surfaces of each wheel.

Figure 2:
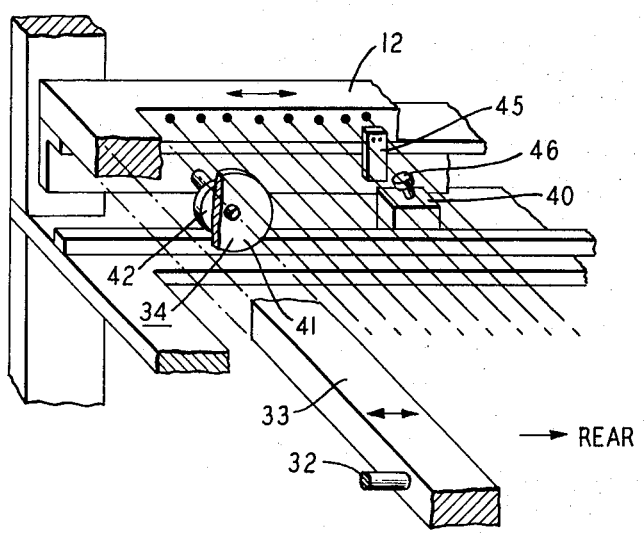
FIG. 2 shows details of a limit switch and its mounting.

With reference to FIG. 2, the motion of framework 12 in response to motor 30 is under control of a pair of limit switches 40 and 43 which are activated by the motion of framework 12. These switches may illustratively be pnuematic or electric, but the operational logic is the same. As the framework moves toward the front (see arrow), stop 45 contacts toggle member 46 of switch 40. Stop 45 moves toggle member 46 toward its rear position which causes the motor winding field to reverse. Framework 12 then moves rearward and a similar engagement occurs with limit switch 43 (not shown in detail) to reverse the motor winding again. Alternative mechanical methods may also be used for motor 30 such as a crank shaft driven by a circular or cam motor arrangement.

My cutter arrangement is equipped with a sloped loading pan 37 which routes the cut plastic away from the cutter and into a loading scheme (not shown).

Since the plastic products of my process may have a crust on the surface due to cutting with heat, or, by the melting process, it is possible to pass the products through a set of pinch rollers to break the surfaces. In addition, in some applications it may be desireable to pass the products through a de-staticzing area to remove any electric charges.

WIRE GRID SECURING ARRANGEMENTS

I have recognized that one potential drawback to the efficient and satisfactory general usuage of all plastic cutter apparatus is in the adjustment of the spacing of wires in a grid. In FIG. 1, I've shown a relatively inflexible arrangement for maintaining the spatial separation between wires. So long as no adjustments have to be made, this arrangement is quite satisfactory. But, I visualize a more adaptable system and to this end FIGS. 3 to 5 depict adjustable wire fastening arrangements.

Figure 3:
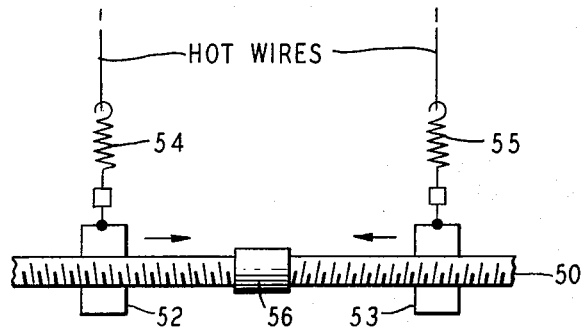
FIGS. 3 to 5 depict various alternative mounting schemes for the wires of a grid to teach various types of apparatus for varying the spacings of hot wires on a framework.

FIG. 3 incorporates a threaded shaft 50 which to the left side of mid-section 56 has a left-hand thread and to the right side has a right hand thread. Internally threaded nuts 52 and 53 engage respectively the left and right hand sections of shaft 50 so that rotation thereof in one direction moves the hot wires closer together — and the opposite direction moves them apart. Springs 54 and 55 maintain the tension of the hot wires as the adjustments are made.

Figure 4:
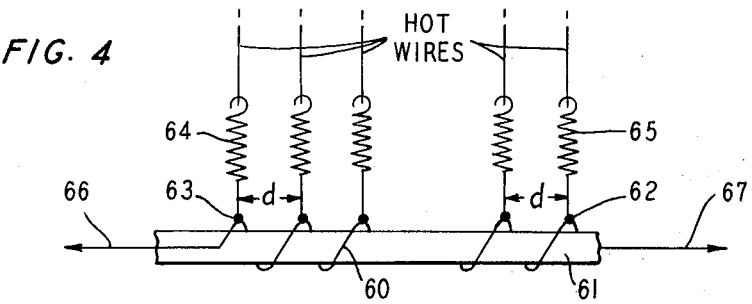

FIG. 4 shows a cyclindrical member 61 about which a rather loosely coiled spring 60 is wrapped. At equal intervals, e.g. 62 and 63, along spring 60 several hot wires are fastened via springs, e.g. 64 and 65. As ends 66 and 67 of spring 60 are placed under tension, or that tension is relaxed, spacing "d" increases or decreases, respectively. This spacing is at all times equal between each of the hot wires and the spatial separation is quite easily adjusted when tension in springs 64,65, etc is relaxed.

Figure 5:
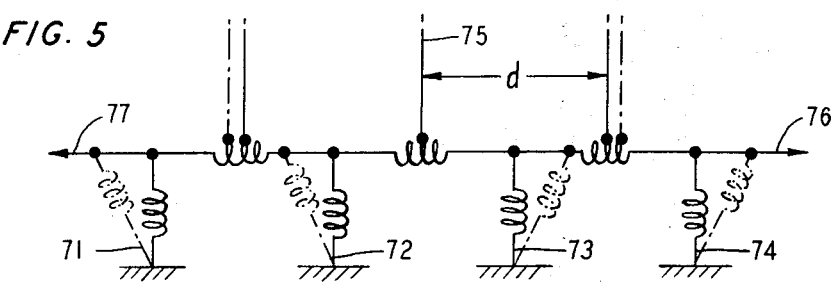

FIG. 5 shows a more theoretical approach to the general problem. As shown an array of springs properly anchored, such as at points 71–74, can be arranged so that the hot wires are moved relative to and uniformly away from one another. As shown the stationary hot wire is wire 75 and as tension is applied or relaxed on ends 76 and 77 the distance "d" relative to wire 75 changes. Note that this spatical adjustments is uniform to either side of wire 75.

CONCLUSION

It is considered to be within the skill of the art to make minor variations in my teaching but such variations are also considered to be within the spirit and scope of my invention. For example, it is possible to have two synchoronously moving grids, or an aperiodic moving grid to create intricate shapes in plastic. It is further possible to place each of the grids under control of a device, such as a computer or other programned controls so that their relative positions as well as wire separations may be atuned to the material introduced at the top of the cutter.

What I claim is:

1. A gravity-fed cutter arrangement for shaping thermo-plastic material comprising a first framework having a plurality of equally spaced wires, said framework being secured to supporting members which position said wires in a substantially horizontal plane, a second framework also secured to said supporting members and aligned below said first framework, said second framework having a second purality of equally spaced wires lying substantially in a horizontal plane and oriented tranverse to said first plurality of wires, and a third framework aligned below said second framework and having a third plurality of of equally spaced wires, said third framework being adapted for reciprocating motion within a horizontal plane under said aligned first and second frameworks.

2. The invention set forth in claim 1 further including means for connecting a source of voltage potential to all of said wires in the first, second and third frameworks concurrently.

3. The invention set forth in claim 1 further including a first and second voltage potential, said first voltage potential being connected to said first and second plurality of wires, and said second voltage potential being connected to said third plurality of wires whereby a different voltage potential is connected to the wires of the framework subjected to reciprocal motion.

4. The invention set forth in claim 1 wherein at least one of said frameworks contains means for automatically and uniformly adjusting the spatial separation between the wires therein.

5. The invention set forth in claim 1 further including guiding means on said supporting members and cooperating guiding means on said third framework for constraining the reciprocating motion of said third framework in alignment under said first and second frameworks.

6. The invention set forth in claim 1 wherein said wiring in each of said frameworks is series wired and thereby adapted to carry a uniform electric current there through.

7. A gravity-feed plastic cutter apparatus for slicing thermo-plastic material along three separate axes, said apparatus comprising a first rectangular framework secured to an upright supporting member for positioning said framework in a horizontal plane, said framework including a first plurality of evenly spaced wires attached to opposite sides of said framework, a second rectangular framework also secured to said supporting member so as to be aligned directly below said first framework is a plane parallel thereto, said second framework including a second plurality of evenly spaced wires attached to opposite sides of said second framework and oriented tranverse to said first plurality of wires, a third rectangular framework moveable mounted in said supporting member below said second framework and including therein a third plurality of evenly spaced wires attached to opposite sides of said third framework, means connecting said third framework to said supporting member for restricted reciprocating motion within a horizontal plane and along an axes parallel to said second plurality of wires, said third plurality of wires being oriented transverse to said second plurality of wires, and means for coupling a voltage potential to the wires of all said frameworks to activate the thermo-plastic cutting process.

8. The invention of claim 7 further including means for uniformly adjusting the relative spatial separation of wires in at least one of said framework.

9. The invention of claim 7 wherein the voltage potential applied to said wires causes the generation of wire temperatures in the order of 800° F.

* * * * *